United States Patent
van Haalen et al.

(10) Patent No.: US 8,953,499 B2
(45) Date of Patent: Feb. 10, 2015

(54) METHOD AND APPARATUS FOR ESTABLISHING SPANNING TREES

(75) Inventors: Ronald van Haalen, Nijmegen (NL); Arie Johannes de Heer, Hengelo (NL)

(73) Assignee: Alcatel Lucent, Boulogne-Billancourt (FR)

( * ) Notice: Subject to any disclaimer, the term of this patent is extended or adjusted under 35 U.S.C. 154(b) by 2060 days.

(21) Appl. No.: 11/126,504

(22) Filed: May 11, 2005

(65) Prior Publication Data

US 2006/0268747 A1 Nov. 30, 2006

(51) Int. Cl.
H04L 12/28 (2006.01)
H04L 12/46 (2006.01)
H04L 12/24 (2006.01)

(52) U.S. Cl.
CPC .............. *H04L 12/462* (2013.01); *H04L 41/12* (2013.01); *H04L 41/0654* (2013.01)
USPC ........................................................ 370/256

(58) Field of Classification Search
USPC ......... 370/217, 219, 248, 255, 256, 400, 401, 370/389, 408; 709/220, 221, 222, 231, 239, 709/240
See application file for complete search history.

(56) References Cited

U.S. PATENT DOCUMENTS

| | | | |
|---|---|---|---|
| 6,898,189 B1 * | 5/2005 | Di Benedetto et al. | 370/256 |
| 7,061,858 B1 * | 6/2006 | Di Benedetto et al. | 370/219 |
| 7,149,795 B2 * | 12/2006 | Sridhar et al. | 709/223 |
| 7,177,946 B1 * | 2/2007 | Kaluve et al. | 709/242 |
| 7,342,877 B1 * | 3/2008 | Ervin et al. | 370/225 |
| 7,701,881 B1 * | 4/2010 | Sankaran | 370/256 |
| 7,860,031 B2 * | 12/2010 | Sasagawa et al. | 370/256 |
| 7,872,989 B1 * | 1/2011 | Tong et al. | 370/254 |

* cited by examiner

*Primary Examiner* — Brian O'Connor
(74) *Attorney, Agent, or Firm* — Wall & Tong, LLP (57) ABSTRACT

The invention includes a method and apparatus for configuring a spanning tree. Specifically, one method according to the present invention includes determining a network topology associated with at least a portion of a network where the network topology includes at least one bridge and at least one link, obtaining network information associated with the network, and computing the spanning tree according to the network topology information and the network information. The network information is operable for evaluating the at least one bridge and the at least one link for inclusion in the spanning tree. The spanning tree includes at least one spanning tree segment, where the at least one spanning tree segment includes at least one communication path operable for supporting network traffic.

20 Claims, 4 Drawing Sheets

METHOD AND APPARATUS FOR ESTABLISHING SPANNING TREES

FIELD OF THE INVENTION

The invention relates to the field of communication networks and, more specifically, to management of spanning trees.

BACKGROUND OF THE INVENTION

In general, Ethernet bridges are used to connect Ethernet local area network (LAN) segments in order to form a bridged LAN network (BLN). The Ethernet bridges interconnect the LAN segments such that from a terminal connected to a BLN, all other terminals connected to the BLN may be reached as if they are connected to the same LAN. In order to ensure that the bridges are interconnected in a loop-free topology, the bridges may run a spanning tree protocol (e.g., a virtual bridged LAN spanning tree protocol (IEEE 802.1Q-2004), a current rapid spanning tree protocol (IEEE 802.1D-2004), and like spanning tree protocols as known in the art). In general, such protocols determine whether associated ports of a bridge should be configured as blocking ports (i.e., no traffic is transmitted or received via this port) or forwarding ports (i.e., traffic may be transmitted and received via this port). By blocking ports to links that create a loop, the topology is guaranteed to be loop-free.

Unfortunately, in the process of changing a port state from blocking to forwarding (and, similarly, from forwarding to blocking), the port may enter various transient states. For example, in the IEEE 802.1D spanning tree protocol, a listening state and a learning state are defined. Furthermore, in addition to ensuring a loop-free topology, a spanning tree protocol may provide a protection topology in case of network failures (e.g., bridge failures, link failures, and the like). Since network failures typically lead to a loss of connectivity, a protection topology comprises another possible topology that restores connectivity. As such, existing spanning tree protocols will generally reconfigure from the disconnected topology to a connected topology (i.e., the protection topology).

Unfortunately, in existing spanning tree protocols, a particular spanning tree is used irrespective of the traffic load associated with that spanning tree, even though another spanning tree would result in improved network performance. Furthermore, existing spanning tree protocols render traffic engineering quite difficult, and provide network operators with only limited influence over the resulting spanning tree. For example, although existing spanning tree protocols allow link cost modifications, tracking the consequences of such changes is extremely complicated. Furthermore, if a network failure occurs, the resulting protection spanning tree is difficult for a network operator to predict. As such, existing spanning tree protocols do not support establishment of optimum spanning trees.

SUMMARY OF THE INVENTION

Various deficiencies in the prior art are addressed through the invention of a method and apparatus for configuring a spanning tree. Specifically, a method according to one embodiment of the invention comprises determining a network topology associated with at least a portion of a network where the network topology comprises at least one bridge and at least one link, obtaining network information associated with the network, the network information operable for evaluating the at least one bridge and the at least one link for inclusion in the spanning tree, and computing the spanning tree according to the network topology information and the network information, the spanning tree comprising at least one spanning tree segment where the at least one spanning tree segment comprises at least one communication path operable for supporting network traffic.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is discussed within the context of a communications network architecture comprising a core network; however, the present invention can readily be applied to other networks and network topologies. In general, the present invention comprises an improved spanning tree protocol operable for managing (e.g., establishing, maintaining, and terminating) at least one spanning tree. In one embodiment, the present invention enables establishment and maintenance of an optimum spanning tree. In one embodiment, the present invention maintains an optimum spanning tree using automatic spanning tree restoration capabilities (e.g., facilitating switching between active communication paths and protection communication paths in response to various network conditions).

In one embodiment, the present invention enables optimization of at least a portion of an existing spanning tree. In one further embodiment, the present invention ensures that all potential protection communication paths are considered during maintenance of an optimum spanning tree, thereby obviating the need to use explicitly provisioned protection communication paths for maintaining a spanning tree. As such, the present invention enables establishment and maintenance of an optimum spanning tree, thereby obviating the need for existing spanning tree protocols in which the spanning tree is decided by chance.

Figure 1:
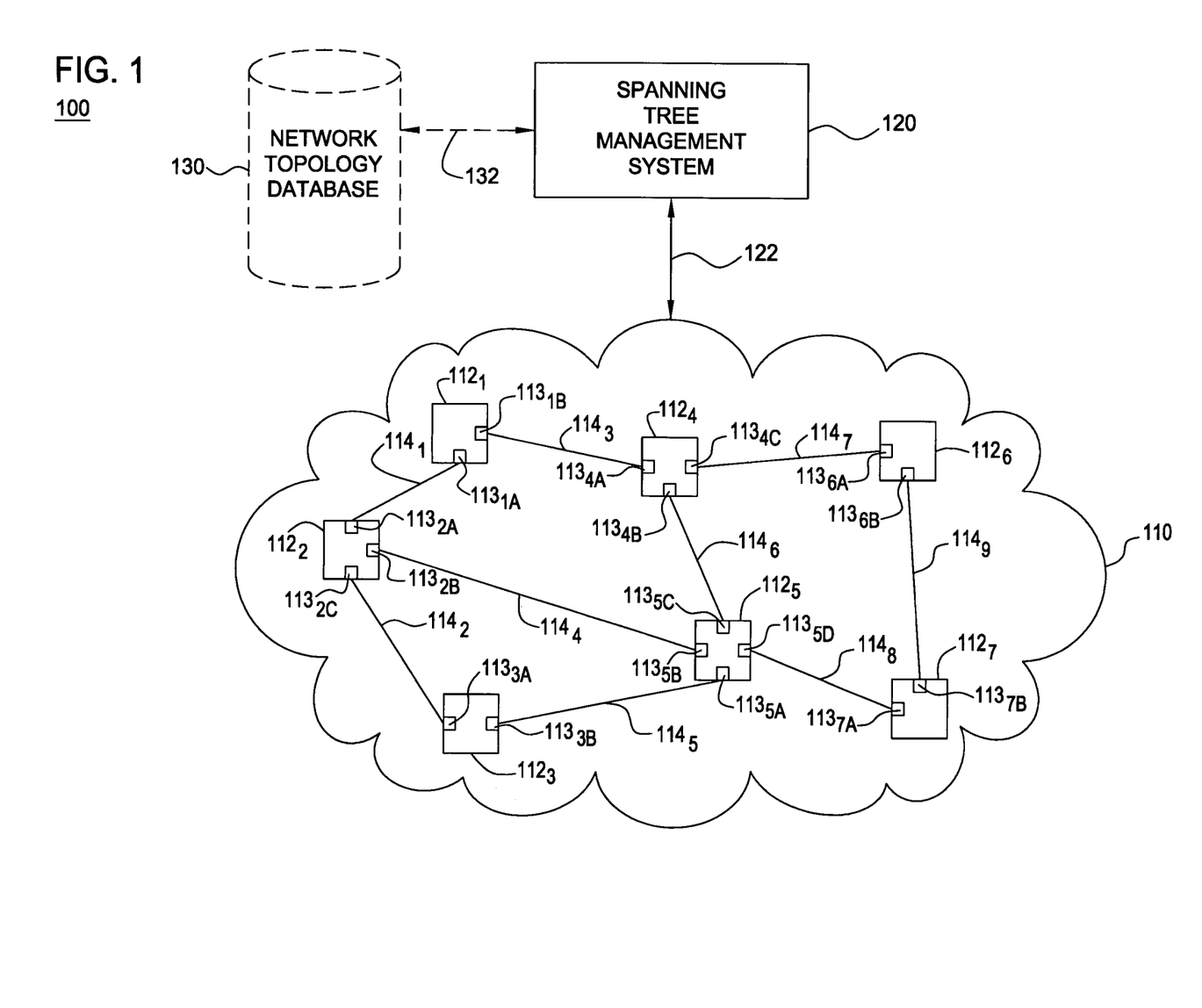
FIG. 1 depicts a high-level block diagram of a communications network architecture.

FIG. 1 depicts a high-level block diagram of a communications network architecture. More specifically, communications network architecture 100 of FIG. 1 comprises a network 110 and a spanning tree management system (STMS) 120. In general, network 110 comprises a network operable for supporting at least one spanning tree. In general, a spanning tree provides communication path redundancy while preventing undesirable loops typically resulting from a plurality of active paths between network elements. For example, in one embodiment, network 110 comprises an Ethernet network comprising a plurality of Ethernet switches (illustratively, bridges 112).

As depicted in FIG. 1, network 110 comprises a plurality of bridges $112_1$-$112_7$ (collectively, bridges 112) in communication using a plurality of links $114_1$-$114_9$ (collectively, links 114). The bridges 112 comprise network elements operable for supporting at least one spanning tree. In one embodiment, the spanning tree spans each of the bridges 112 in network 110 while forcing redundant paths into a blocking (i.e., standby) state. As such, bridges 112 are operable for supporting spanning tree bridge parameters such bridge priority, hello time, maximum wait time, forward delay, path cost, topology change trap suppression, transmit hold count, and like spanning tree bridge parameters.

As depicted in FIG. 1, bridges 112 comprise respective pluralities of ports. The bridge $112_1$ comprises ports $113_{1A}$-$113_{1B}$ (collectively, ports $113_1$), bridge $112_2$ comprises ports $113_{2A}$-$113_{2C}$ (collectively, ports $113_2$), bridge $112_3$ comprises ports $113_{3A}$-$113_{3B}$ (collectively, ports $113_3$), bridge $112_4$ comprises ports $113_{4A}$-$113_{4C}$ (collectively, ports $113_4$), bridge $112_5$ comprises ports $113_{5A}$-$113_{5B}$ (collectively, ports $113_5$), bridge $112_6$ comprises ports $113_{6A}$-$113_{6B}$ (collectively, ports $113_6$), and bridge $112_7$ comprises ports $113_{7A}$-$113_{7B}$ (collectively, ports $113_7$). The ports $113_1$-$113_7$ are collectively denoted as ports 113.

In one embodiment, the ports 113 are operable for supporting at least one spanning tree and associated spanning tree parameters such as path cost, port state, and like parameters. In one embodiment, a port state comprises one of: blocking and forwarding. A port comprising a port state of blocking is unable to transmit and receive traffic. A port comprising a port state of forwarding is able to transmit and receive traffic. In one embodiment, ports associated with active spanning tree communication paths (i.e., active spanning tree segments) are set to forwarding and ports associated with protection spanning tree communication paths (i.e., protection spanning tree segments) are set to blocking. In one embodiment, upon detection of a network condition requiring activation of a protection path, the respective port states of the ports associated with the protection path are switched from blocking to forwarding.

As depicted in FIG. 1, link $114_1$ enables communication between ports $113_{1A}$ and $113_{2A}$, link $114_2$ enables communication between ports $113_{2C}$ and $113_{3A}$, link $114_3$ enables communication between ports $113_{1B}$ and $113_{4A}$, link $114_4$ enables communication between ports $113_{2B}$ and $113_{5B}$, link $114_5$ enables communication between ports $113_{3B}$ and $113_{5A}$, link $114_6$ enables communication between ports $113_{4B}$ and $113_{5C}$, link $114_7$ enables communication between ports $113_{4C}$ and $113_{6A}$, link $114_8$ enables communication between ports $113_{5D}$ and $113_{7A}$, and link $114_9$ enables communication between ports $113_{6B}$ and $113_{7B}$. In one embodiment, links 114 comprise respective link costs.

In one embodiment, a link cost is determined according to a link speed. In one such embodiment, link cost and link speed are inversely proportional (i.e., link cost increases as link speed decreases). In another embodiment, a link cost is determined according to network traffic volume associated with the link. The network traffic volume may comprise estimated traffic volume, actual traffic volume, and the like. In one such embodiment, link cost and traffic volume are directly proportional (i.e., link cost increases as link traffic volume increases). Although described herein as determined according to link speed and network traffic volume, a link cost may be determined using various other factors.

In general, STMS 120 comprises a system operable for managing (i.e., establishing, maintaining, modifying, optimizing, terminating, and the like) at least one spanning tree in at least one network. As depicted in FIG. 1, STMS 120 communicates with network 110 using a communication link (CL) 122. As such, although not depicted as being directly connected to bridges 112, STMS 120 communicates with bridges 112 for managing spanning trees. In one embodiment, STMS 120 optionally communicates with a network topology database (NTD) 130 using an associated communication link (CL) 132. In one such embodiment, STMS 120 retrieves network topology information from NTD 130 for use in computing spanning trees. In another embodiment (not depicted), at least a portion of NTD 130 is implemented as a portion of STMS 120.

In one embodiment, STMS 120 establishes a spanning tree in a network (illustratively, network 110). Similarly, in another embodiment, STMS 120 establishes a portion of a spanning tree in a network. In one such embodiment, the remaining portion of the spanning tree is computed using an existing spanning tree protocol as known in the art. In one embodiment, STMS 120 uses various information (e.g., network topology information, network traffic volume information, and like information) in order to compute a spanning tree. In one embodiment, such parameters may be used for computing active communication paths of a spanning tree, as well as protection communication paths of the spanning tree. In one embodiment, STMS 120 determines bridge priority, link cost, and like parameters required for implementing a computed spanning tree in a network (illustratively, network 110).

In another embodiment, STMS 120 may reconfigure at least a portion of an existing spanning tree in network 110 in response to at least one network condition. For example, STMS 120 may reconfigure an existing spanning tree in response to failure of one of the bridges 112, failure of one of the links 114, an increase in traffic on one of the links 114, and the like. In one embodiment, STMS 120 monitors at least one of estimated traffic volume, actual traffic volume, and like parameters associated with each of the links 114 for use in computing a spanning tree. As such, in one embodiment, management of an existing spanning tree comprises re-computation of the optimum spanning tree. Thus, in one embodiment, STMS 120 performs at least a portion of the methodologies depicted and described herein.

Although depicted as comprising specific numbers of networks 110, bridges 112, ports 113, links 114, STMSs 120, CLs 122, NTDs 130, and CLs 132, those skilled in the art will appreciate that fewer or more networks 110, bridges 112, ports 113, links 114, STMSs 120, CLs 122, NTDs 130, and CLs 132 may be used. Similarly, networks 110, bridges 112, ports 113, links 114, STMSs 120, CLs 122, NTDs 130, and CLs 132 may be deployed in various different configurations. As such, management of spanning trees according to the present invention is not limited by factors such as network type, network size, network topology, and the like factors.

Figure 2:
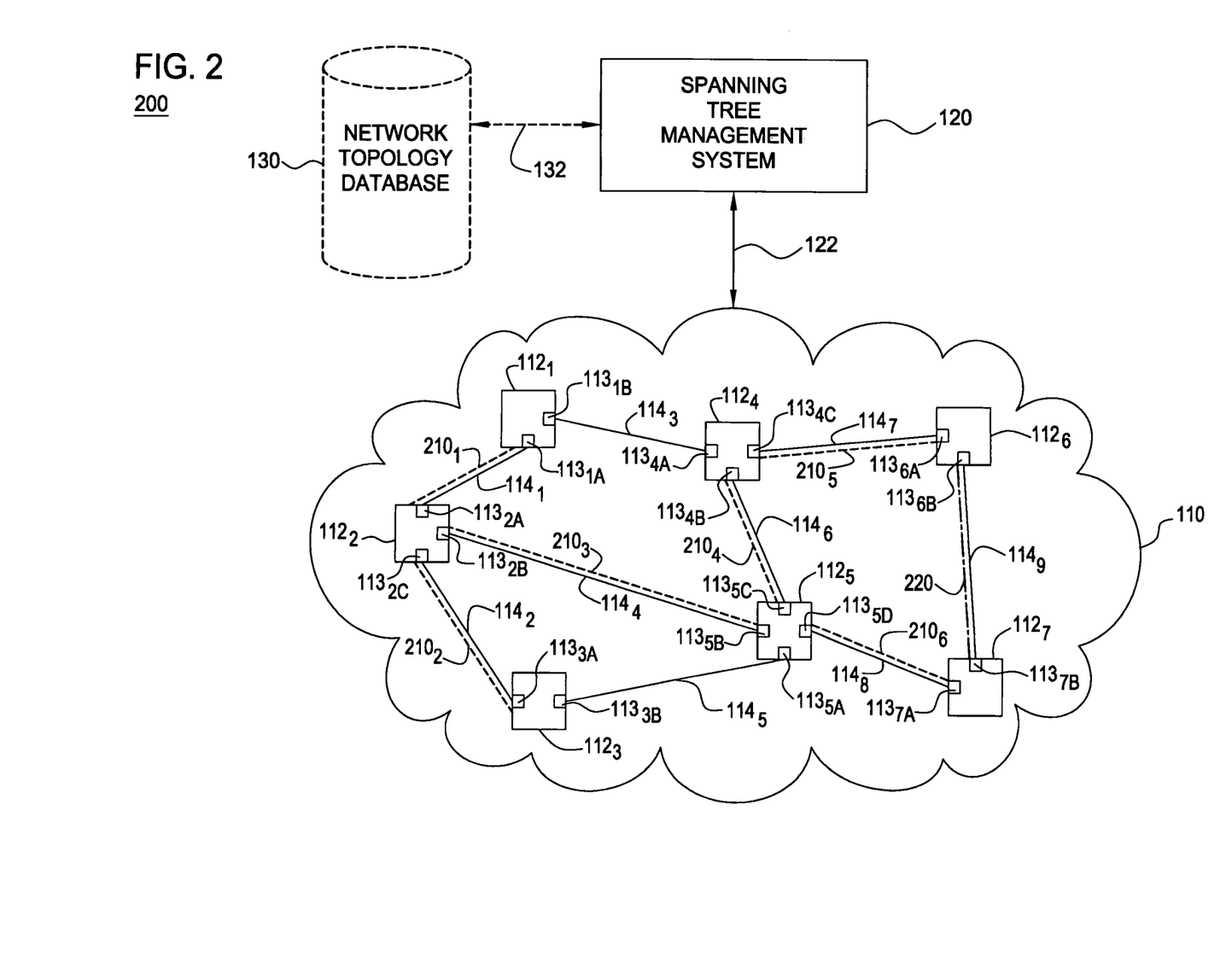
FIG. 2 depicts a spanning tree established in the communication network architecture of FIG. 1.

FIG. 2 depicts a spanning tree established in the communications network architecture of FIG. 1. Specifically, spanning tree 200 of FIG. 2 comprises a plurality of active spanning tree segments (ASTSs) $210_1$-$210_6$ (collectively, ASTSs 210) and a protection spanning tree segment (PSTS) 220. In general, a spanning tree segment comprises a communication path between two bridges operable for transporting traffic over the spanning tree. The ASTS $210_1$ comprises a communication path traversing link $114_1$, ASTS $210_2$ comprises a communication path traversing link $114_2$, ASTS $210_3$ comprises a communication path traversing link $114_4$, ASTS $210_4$ comprises a communication path traversing link $114_6$, ASTS $210_5$ comprises a communication path traversing link $114_7$, and ASTS $210_6$ comprises a communication path traversing link $114_8$.

As depicted in FIG. 2, spanning tree 200 comprises a loop-free spanning tree. In one embodiment, as depicted in FIG. 2, ports $113_{1A}$ and $113_{2A}$ associated with ASTS $210_1$ comprise forwarding ports, ports $113_{2C}$ and $113_{3A}$ associated with ASTS $210_2$ comprise forwarding ports, ports $113_{2B}$ and $113_{5B}$ associated with ASTS $210_3$ comprise forwarding ports, ports $113_{5C}$ and $113_{4B}$ associated with ASTS $210_4$ comprise forwarding ports, ports $113_{4C}$ and $113_{6A}$ associated with ASTS $210_5$ comprise forwarding ports, and ports $113_{5D}$ and $113_{7A}$ associated with ASTS $210_6$ comprise forwarding ports. Furthermore, ports $113_{1B}$ and $113_{4A}$ associated with link $114_3$ comprise blocking ports, ports $113_{3B}$ and $113_{5A}$ associated with link $114_5$ comprise blocking ports, and ports $113_{6B}$ and $113_{7B}$ associated with link $114_9$ comprise blocking ports. As such, each bridge 112 is reachable by every other bridge 112 using the loop-free spanning tree topology.

The PSTS 220 comprises a protection communication path between ports $113_{6B}$ and $113_{7B}$. In one embodiment, for example, PSTS 220 provides protection for ASTS $210_5$. Similarly, in another embodiment, for example, PSTS 220 provides protection for ASTS $210_6$. In another embodiment, PSTS 220 provides protection for both ASTS $210_5$ and ASTS $210_6$. For example, failure of link $114_7$ results in failure of associated ASTS $210_5$. As such, in one embodiment, PSTS 220 is converted from a protection communication path to an active communication path in response to detection of the failure of link $114_7$ (or, similarly, in response to detection of the failure of ASTS $210_5$).

In one such embodiment, ports $113_{6B}$ and $113_{7B}$ are converted from blocking ports to forwarding ports, thereby enabling traffic traveling between bridges $112_4$ and $112_6$ to traverse bridges $112_5$ and $112_7$ (i.e., traversing ASTS $210_4$, ASTS $210_6$, and PSTS 220). As such, spanning tree 200 of FIG. 2 is reconfigured to maintain loop-free connectivity between each of the bridges 112. In one further embodiment, ports $113_{4C}$ and $113_{6A}$ are converted from forwarding ports to blocking ports, thereby preventing establishment of a loop on bridges $112_4$, $112_5$, $112_6$, and $112_7$ upon restoration of link $114_7$ from a failure state to an active state. A method for managing a spanning tree (illustratively, spanning tree 200 of FIG. 2) according to the methodologies of the present invention is depicted and described herein with respect to FIG. 3.

Figure 3:
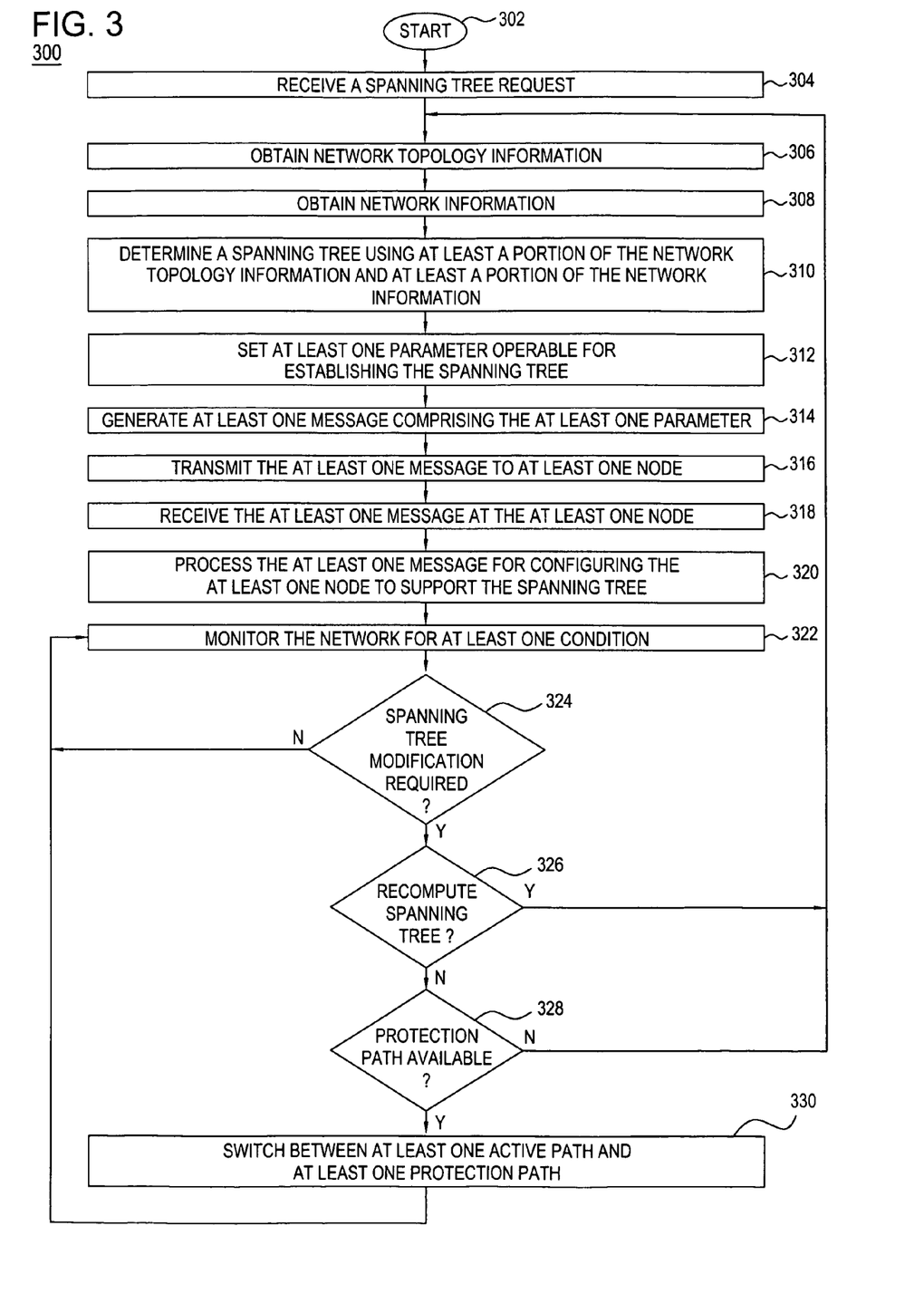
FIG. 3 depicts a flow diagram of a method according to one embodiment of the invention.

FIG. 3 depicts a flow diagram of a method according to one embodiment of the invention. Specifically, method 300 of FIG. 3 comprises a method for determining a spanning tree. In one embodiment, a spanning tree determined according to the methodologies of the present invention comprises an optimum spanning tree. In one embodiment, a portion of a spanning tree is determined according to the methodologies of the present invention. Although a portion of the steps are depicted as being performed serially, those skilled in the art will appreciate that at least a portion of the steps of method 300 may be performed contemporaneously, as well as in a different order than presented in FIG. 3. The method 300 is entered at step 302 and proceeds to step 304.

At step 304, a spanning tree request is received. In one embodiment, a spanning tree request comprises a request to establish a spanning tree. In another embodiment, a spanning tree request comprises a request to modify an existing spanning tree. In one further embodiment, a spanning tree request to modify a spanning tree is received in response to at least one network condition (e.g., a bridge failure, a link failure, and the like). In another further embodiment, a spanning tree request to modify a spanning tree comprises a request to optimize an existing spanning tree (e.g., a spanning tree request initiated manually by a user). In another embodiment, a spanning tree request comprises a request to terminate an existing spanning tree.

In one embodiment, a spanning tree request is received by a management system (illustratively, STMS 120). In another embodiment, a spanning tree request is received by at least one bridge (illustratively, at least one of the bridges 112). In one embodiment, a spanning tree request is received from at least one bridge (illustratively, one of the bridges 112). For example, upon detecting the failure of link $114_7$, bridge $112_4$ may initiate a request to STMS 120 to modify the spanning tree by computing a reconfigured optimum spanning tree, activating a pre-provisioned protection communication path (e.g., PSTS 220), and the like. In one embodiment, a spanning tree request is received from at least one remote system (e.g., a remote system in communication with STMS 120).

At step 306, network topology information is obtained. In one embodiment, network topology information comprises bridge information, port information, link information, connectivity information, and like network topology information. In one embodiment, network topology information is obtained by a management system (illustratively, STMS 120). In one such embodiment, STMS 120 obtains network topology information from at least one local database. In another embodiment, STMS 120 obtains network topology information from at least one remote network topology database (illustratively, NTD 130). In another embodiment, STMS 120 obtains network topology information by performing discovery on a network (illustratively, network 110). In one embodiment, as described herein, at least a portion of the network topology information is used for computing at least one spanning tree.

At step 308, network information is obtained. In one embodiment, at least a portion of the network information is used for computing at least one spanning tree. In one embodiment, network information is obtained from at least one management system. In one embodiment, network information comprises manually entered information. In one such embodiment, network information comprises manually entered information operable for computing an optimum spanning tree. In one embodiment, network information comprises information automatically discovered from the network, received from at least one remote system, and the like. As such, network information generally comprises any information operable for use in computing a spanning tree according to the present invention.

In one embodiment, network information comprises link cost information. In one embodiment, network information comprises network performance information. In one such embodiment, network performance information comprises at least one of an estimated traffic volume information, an actual traffic volume information, and like traffic volume information. In one such embodiment, traffic volume information is used for prioritizing bridges, ports, and links for selection during computation of a spanning tree. For example, above-average estimated traffic volume on link 1143 may result in assignment of a below-average priority to link 1143, thereby reducing the probability of selection of link 1143 for supporting an ASTS of the optimum spanning tree.

At step 310, a spanning tree is determined. In general, a spanning tree comprises at least one ASTS (illustratively, ASTSs 210) and, optionally, at least one PSTS (illustratively, PSTS 220). As such, in one embodiment, determination of a spanning tree comprises determining at least one ASTS. In one embodiment, determination of a spanning tree comprises determining at least one PSTS. In one embodiment, determination of a spanning tree comprises associating at least one PSTS to at least one ASTS. For example, as depicted in FIG. 2, determination of spanning tree 200 may comprise associating PSTS 220 with ASTSs $210_5$ and $210_6$ such that failure of ASTS $210_5$ or failure of ASTS $210_6$ results in conversion of PSTS 220 from a PSTS to an ASTS operable for transporting network traffic. In one embodiment, an optimum spanning tree is determined. In one embodiment, a shortest path algorithm is used for determining an optimum spanning tree.

In one embodiment, a spanning tree is determined using at least a portion of the network topology information. In one embodiment, for example, network topology information is used for ensuring that the topology of the established spanning tree is loop-free. As described herein, loops occur as a result of multiple active paths between bridges. For example, following selection of links $114_1$, $114_4$, and $114_6$ for use in a spanning tree, network topology information is used to ensure that link $114_3$ is not selected for use in the spanning tree. As such, in one embodiment, by analyzing potential combinations of bridges 112 and links 114 for use in a spanning tree, an optimum spanning tree may be determined.

In one embodiment, a spanning tree is determined using at least a portion of the network information. In one embodiment, for example, manually configured information specified by a network operator is used for determining a spanning tree. In another embodiment, for example, network performance information is used for prioritizing bridges according to bridge capacity, for prioritizing links according to associated link capacity, and the like. For example, establishment of a spanning tree segment between two high-capacity bridges connected via a low-cost link is preferable to establishment of a spanning tree segment between two low-capacity bridges connected via a high-cost link. As such, in one embodiment, higher priority bridges, ports, and links may be selected for use in supporting ASTSs while lower priority bridges, ports, and links may be reserved for supporting PSTSs.

At step 312, at least one parameter operable for establishing the spanning tree is set. In one embodiment, a parameter is associated with an ASTS. In another embodiment, a parameter is associated with a PSTS. In one embodiment, a parameter comprises a bridge priority (e.g., a bridge priority). In another embodiment, a parameter comprises a path cost. Although primarily described herein with respect to bridge priority and path cost, those skilled in the art will appreciate that various other parameters operable for establishing a spanning tree may be set, such as hello time, maximum wait time, forward delay, transmit hold count, port state, and like parameters.

In one embodiment, the at least one parameter operable for establishing the spanning tree is set by a management system (illustratively, STMS 120). For example, as depicted with respect to FIG. 2, spanning tree 200 of FIG. 2 is established by setting respective link costs associated with links $114_1$, $114_2$, $114_4$, $114_6$, $114_7$, and $114_8$ to low values and setting respective link costs associated with links $114_3$, $114_5$, and $114_9$ to high values. The setting of link costs in this manner tends to enable the flow of network traffic along links $114_1$, $114_2$, $114_4$, $114_6$, $114_7$, and $114_8$ (i.e., ASTSs $210_1$ through $210_6$, respectively) while preventing the flow of network traffic along links $114_3$, $114_5$, and $114_9$, thereby resulting in establishment of an optimum, loop-free spanning tree (illustratively, spanning tree 200).

At step 314, at least one message comprising at least one parameter is generated. In one embodiment, generation of the at least one message is performed by a management system (illustratively, STMS 120). At step 316, the at least one message is transmitted to at least one bridge. In one embodiment, the at least one message is transmitted to the at least one bridge by a management system (illustratively, STMS 120). At step 318, the at least one message is received at the at least one bridge. At step 320, the at least one message is processed for configuring the at least one bridge to support the spanning tree.

At step 322, the network is monitored for at least one condition. In one embodiment, the at least one condition comprises a condition which requires modification of the spanning tree. At step 324, a determination is made as to whether a spanning tree modification is required. As described herein, in one embodiment, a spanning tree modification is required in response to at least one of a bridge failure, a port failure, a link failure, a change in network traffic volumes (e.g., triggering an associated change in path cost values), a request initiated by a remote system, a manual user-initiated request, and the like. In another embodiment, a spanning tree modification is required in response to a clearing of a previous condition (e.g., a previously failed link is restored). If a spanning tree modification is not required, method 300 returns to step 322. If a spanning tree modification is required, method 300 proceeds to step 326.

At step 326, a determination is made as to whether to re-compute the spanning tree. Although not depicted, in one embodiment, the determination as to whether to re-compute a spanning tree is performed in response to a determination as to whether at least one protection path is available. In another embodiment, the determination as to whether to re-compute the spanning tree is performed in response to a clearing of a previous condition (e.g., a previously failed link is restored). If the spanning tree is recomputed, the method 300 returns to step 306, at which point processing to recomputed the spanning tree is initiated. If the spanning tree is not recomputed, the method 300 proceeds to step 328.

At step 328, a determination is made as to whether a path is available. In one embodiment, in which the detected condition comprises a condition requiring activation of protection switching, the determination as to whether a path is available comprises a determination as to whether a protection path is available. For example, if an active spanning tree segment fails (e.g., due to an associated link failure), a determination is made as to whether a protection spanning tree segment is available.

Similarly, in another embodiment, in which the detected condition comprises a clearing of a previous condition, the determination as to whether a path is available comprises a determination as to whether the previous active path is available. For example, if a previously failed spanning tree segment is reactivated, a determination is made as to whether to switch the network traffic from the protection spanning tree segment back to the active spanning tree segment. If a path is not available, method 300 returns to step 306, at which point processing to recomputed the spanning tree is initiated. If a path is available, method 300 proceeds to step 330.

At step 330, a switch between at least one active path and at least one protection path is performed. In one embodiment, upon failure of an active path, at least one protection path is activated for supporting spanning tree traffic. In another embodiment, upon re-availability of an active path for supporting spanning tree traffic, spanning tree traffic is switched from the protection path to the active path (i.e., the protection path returns to a protection state from the temporarily active state). The method 300 returns to step 322, at which point monitoring of the network is performed.

In one embodiment, implementation of protection capabilities according to the present invention comprises using an existing spanning tree protocol to activate a protection path operable for restoring network connectivity. In one such embodiment, the protection path activated in order to restore network connectivity is determined according to the present invention and activated using the existing spanning tree protocol. As such, since the spanning tree parameters associated with both the active paths and the protection paths are determined according to the present invention, the existing spanning tree protocol ultimately converges to an optimum spanning tree determined according to the present invention.

In another embodiment, implementation of protection capabilities according to the present invention comprises using a management system (illustratively, STMS 120) to activate a preconfigured protection path. In one such embodiment, upon detection of a condition requiring a transition of a protection path to an active path, activation of the protection path is performed prior to processing for determining whether activation of the protection path results in an optimum spanning tree. In this embodiment, the present invention overrides the existing spanning tree protocol in order to switch to a protection path outside of the existing spanning tree protocol. In one such embodiment, associated spanning tree parameters may be updated in order to reflect the spanning tree.

Although described herein with respect to establishment of one spanning tree in one network, in one embodiment, a spanning tree may be established across a plurality of networks. Similarly, although primarily described herein with respect to establishment of one spanning tree, in one embodiment, a plurality of spanning trees may be established in a network. In one such embodiment, for example, a plurality of spanning trees may be established for a respective plurality of traffic classes. For example, a first spanning tree may be established to support traffic associated with a first traffic class and a second spanning tree may be established to support traffic associated with a second traffic class. Similarly, for example, a plurality of spanning trees may be established for a respective plurality of customers.

Furthermore, although primarily described herein with respect to establishment of an entire spanning tree, in one embodiment, the present invention may be used for establishing a portion of a spanning tree. In one such embodiment, the remaining portion of the spanning tree may be established using at least one spanning tree protocol as known in the art (e.g., IEEE 802.1D-2004, IEEE 802.1Q-2004, and like spanning tree protocols). Furthermore, although described herein with respect to establishment of protection spanning tree segments using the methodologies of the present invention, in one embodiment, such protection switching may be provided by at least one spanning tree protocol as known in the art.

It is contemplated that at least a portion of the described functions may be combined into fewer functional elements. Similarly, it is contemplated that the various functions may be performed by other functional elements, and that the various functions may be distributed across the functional elements in a different manner. For example, at least a portion of the functions of the present invention may be distributed across a portion of the bridges 112. Furthermore, at least a portion of the functions of the present invention may be performed by other management systems in communication with STMS 120. For example, at least one network traffic monitoring system may communicate with STMS 120 for providing estimated traffic volume statistics, actual traffic volume statistics, and like information used by STMS 120 for computing an optimum spanning tree.

Figure 4:
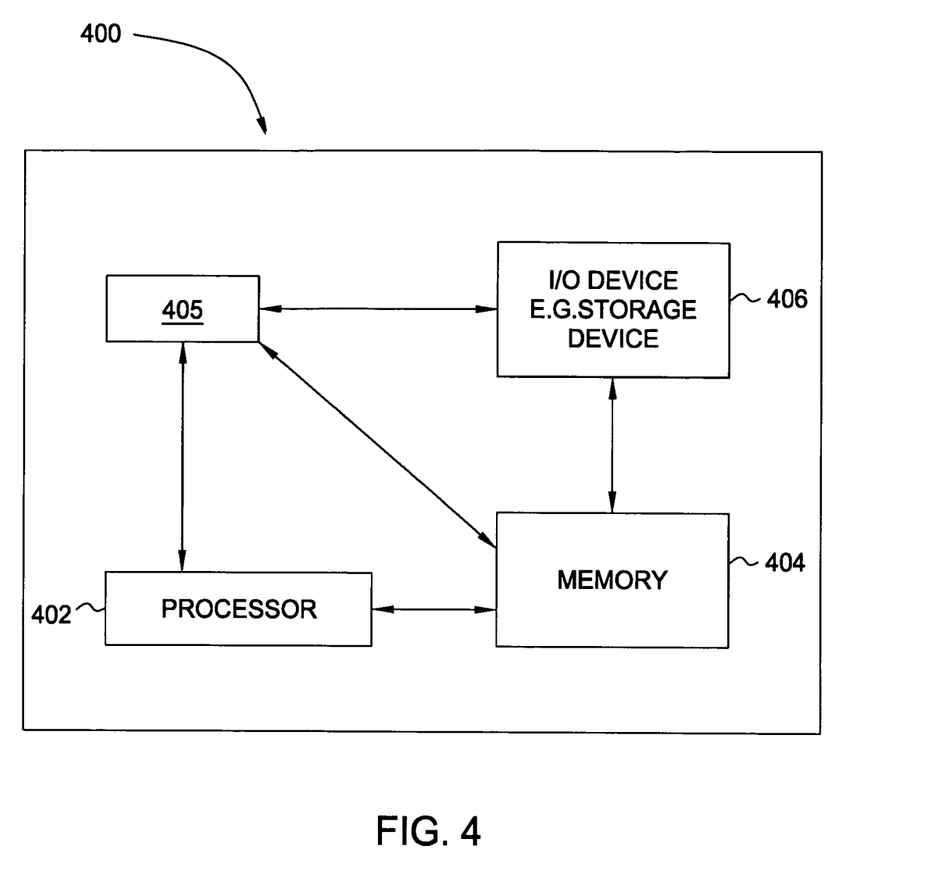
FIG. 4 depicts a high-level block diagram of a general-purpose computer suitable for use in the performing the functions described herein.

FIG. 4 depicts a high-level block diagram of a general purpose computer suitable for use in performing the functions described herein. As depicted in FIG. 4, system 400 comprises a processor element 402 (e.g., a CPU), a memory 404, e.g., random access memory (RAM) and/or read only memory (ROM), a spanning tree management module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present spanning tree management module or process 405 can be loaded into memory 404 and executed by processor 402 to implement the functions as discussed above. As such, spanning tree management process 405 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for establishing a spanning tree in a network comprising a plurality of bridges and a plurality of links, the method comprising:
    obtaining information comprising at least one of network topology information for at least a portion of the network or network information for at least a portion of the network;
    computing the spanning tree based on at least a portion of the obtained information, wherein the computed spanning tree comprises a plurality of spanning tree segments, wherein each of the spanning tree segments comprises a respective communication path between a respective pair of the bridges of the network;
    setting spanning tree parameters for the computed spanning tree, wherein the spanning tree parameters are adapted for establishing the computed spanning tree within the network; and
    establishing the computed spanning tree within the network by transmitting the spanning tree parameters toward the bridges associated with the spanning tree segments of the computed spanning tree.

2. The method of claim 1, wherein the plurality of spanning tree segments comprises a plurality of active spanning tree segments.

3. The method of claim 2, wherein the plurality of spanning tree segments comprises at least one protection spanning tree segment associated with at least one of the active spanning tree segments.

4. The method of claim 1, wherein the computed spanning tree is computed in a manner for improving at least one network parameter, wherein the at least one network parameter comprises at least one of a network throughput and a spanning tree throughput.

5. The method of claim 1, wherein the method is performed by a management system.

6. The method of claim 1, further comprising:
    receiving, at the bridges associated with the spanning tree segments of the computed spanning tree, respective portions of the spanning tree parameters associated with the respective bridges associated with the spanning tree segments of the computed spanning tree; and
    configuring the bridges associated with the spanning tree segments of the computed spanning tree, using the respective portions of the spanning tree parameters, to establish the computed spanning tree within the network.

7. The method of claim 1, wherein the spanning tree parameters comprise bridge priorities and link costs.

8. The method of claim 1, wherein the spanning tree parameters comprise bridge parameters and port parameters.

9. The method of claim 8, wherein at least one of:
for at least one of the bridges associated with at least one of the spanning tree segments of the computed spanning tree, the bridge parameters comprise at least one of: a bridge priority, a hello time, a maximum wait time, a forward delay, a path cost, a topology change trap suppression, and a transmit hold count; or
for at least one of the bridges associated with at least one of the spanning tree segments of the computed spanning tree, the port parameters comprise at least one: of a port state, a link cost, and a link priority.

10. The method of claim 1, further comprising:
computing a second spanning tree using the network topology information based on a determination that a first traffic class associated with the computed spanning tree is different than a second traffic class associated with the second computed spanning tree.

11. The method of claim 1, wherein the network topology information comprises at least one of bridge information associated with at least a portion of the bridges of the network, port information associated with ports of at least a portion of the bridges of the network, link information associated with at least a portion of the links of the network, or connectivity information.

12. The method of claim 1, wherein computing the spanning tree comprises analyzing potential combinations of the bridges and the links for use in the computed spanning tree.

13. The method of claim 1, wherein the network information comprises at least one of link cost information or network performance information.

14. The method of claim 13, wherein the network performance information comprises at least one of estimated traffic volume information or actual traffic volume information.

15. The method of claim 1, wherein the computed spanning tree is computed based on traffic volume information, wherein computing the spanning tree based on traffic volume information comprises prioritizing bridges, ports of bridges, and links for selection for use in the computed spanning tree.

16. The method of claim 1, wherein the computed spanning tree is computed based on network performance information, wherein computing the spanning tree based on network performance information comprises prioritizing bridges according to respective bridge capacity and prioritizing links according to respective link capacity.

17. The method of claim 16, wherein computing the spanning tree based on network performance information comprises preferring establishment of a spanning tree segment between a pair of high-capacity bridges connected via a low-cost link to establishment of a spanning tree segment between a pair of low-capacity bridges connected via a high-cost link.

18. The method of claim 1, wherein the computed spanning tree is computed using a shortest path algorithm.

19. An apparatus for establishing a spanning tree in a network comprising a plurality of bridges and a plurality of links, the apparatus comprising:
a processor and a memory communicatively connected to the processor, the processor configured to:
obtain information comprising at least one of network topology information for at least a portion of the network or network information for at least a portion of the network;
compute the spanning tree based on at least a portion of the obtained information, wherein the computed spanning tree comprises a plurality of spanning tree segments, wherein each of the spanning tree segments comprises a respective communication path between a respective pair of the bridges of the network;
set spanning tree parameters for the computed spanning tree, wherein the spanning tree parameters are adapted for establishing the computed spanning tree within the network; and
establish the computed spanning tree within the network by transmitting the spanning tree parameters toward the bridges associated with the spanning tree segments of the computed spanning tree.

20. A non-transitory computer-readable storage medium storing instructions which, when executed by a computer, cause the computer to perform a method for establishing a spanning tree in a network comprising a plurality of bridges and a plurality of links, the method comprising:
obtaining information comprising at least one of network topology information for at least a portion of the network or network information for at least a portion of the network;
computing the spanning tree based on at least a portion of the obtained information, wherein the computed spanning tree comprises a plurality of spanning tree segments, wherein each of the spanning tree segments comprises a respective communication path between a respective pair of the bridges of the network;
setting spanning tree parameters for the computed spanning tree, wherein the spanning tree parameters are adapted for establishing the computed spanning tree within the network; and
establishing the computed spanning tree within the network by transmitting the spanning tree parameters toward the bridges associated with the spanning tree segments of the computed spanning tree.

* * * * *